(12) United States Patent
Burkinshaw

(10) Patent No.: US 11,526,858 B2
(45) Date of Patent: Dec. 13, 2022

(54) DIGITAL ENGAGEMENT PLATFORM FOR PAYMENT SOLUTIONS WITH CASH-ENABLED MULTIPAY

(71) Applicant: BlytzPay LLC, Draper, UT (US)

(72) Inventor: Robyn Burkinshaw, Salt Lake City, UT (US)

( * ) Notice: Subject to any disclaimer, the term of this patent is extended or adjusted under 35 U.S.C. 154(b) by 0 days.

(21) Appl. No.: 16/869,543

(22) Filed: May 7, 2020

(65) Prior Publication Data

US 2020/0356966 A1 Nov. 12, 2020

Related U.S. Application Data

(60) Provisional application No. 62/844,353, filed on May 7, 2019.

(51) Int. Cl.
| | |
|---|---|
| *G06Q 20/10* | (2012.01) |
| *G06Q 20/32* | (2012.01) |
| *G06Q 20/40* | (2012.01) |
| *G06Q 20/02* | (2012.01) |

(52) U.S. Cl.
CPC ......... *G06Q 20/102* (2013.01); *G06Q 20/023* (2013.01); *G06Q 20/3255* (2013.01); *G06Q 20/3278* (2013.01); *G06Q 20/4012* (2013.01)

(58) Field of Classification Search
None
See application file for complete search history.

(56) References Cited

U.S. PATENT DOCUMENTS

| | | | | |
|---|---|---|---|---|
| 2007/0055623 | A1* | 3/2007 | Ha | G06Q 20/02 705/39 |
| 2012/0136780 | A1* | 5/2012 | El-Awady | G06Q 20/14 705/40 |
| 2012/0179558 | A1* | 7/2012 | Fischer | G06Q 20/20 705/16 |
| 2017/0004501 | A1* | 1/2017 | Ledford | G06Q 20/407 |
| 2018/0322485 | A1* | 11/2018 | Jayaram | G06Q 20/22 |
| 2019/0172059 | A1* | 6/2019 | Castagna | G06Q 20/389 |

\* cited by examiner

*Primary Examiner* — Paul S Schwarzenberg
(74) *Attorney, Agent, or Firm* — PCFB, LLC; Justin K. Flanagan

(57) ABSTRACT

Systems and methods are disclosed herein relating to payment processing systems. Payment processing systems facilitate financial transactions between customers and vendors. Cash-enabled payment processing systems facilitate transactions by those without bank accounts or who choose to use a cash-based system. Communication between vendors and customers simplifies invoicing and encourages payment.

5 Claims, 10 Drawing Sheets

DIGITAL ENGAGEMENT PLATFORM FOR PAYMENT SOLUTIONS WITH CASH-ENABLED MULTIPAY

RELATED APPLICATIONS

This application claims priority to and benefit under 35 U.S.C. § 119 to U.S. Provisional Patent Application No. 62/844,353 filed on May 7, 2019, titled "Cash-Enabled Payment Processing System," which application is hereby incorporated by reference in its entirety.

TECHNICAL FIELD

This disclosure relates to payment processing systems. More particularly, this disclosure relates to payment processing systems utilizing mobile technology to enhance customer experience and facilitate cash transactions.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

DETAILED DESCRIPTION

Figure 1A:
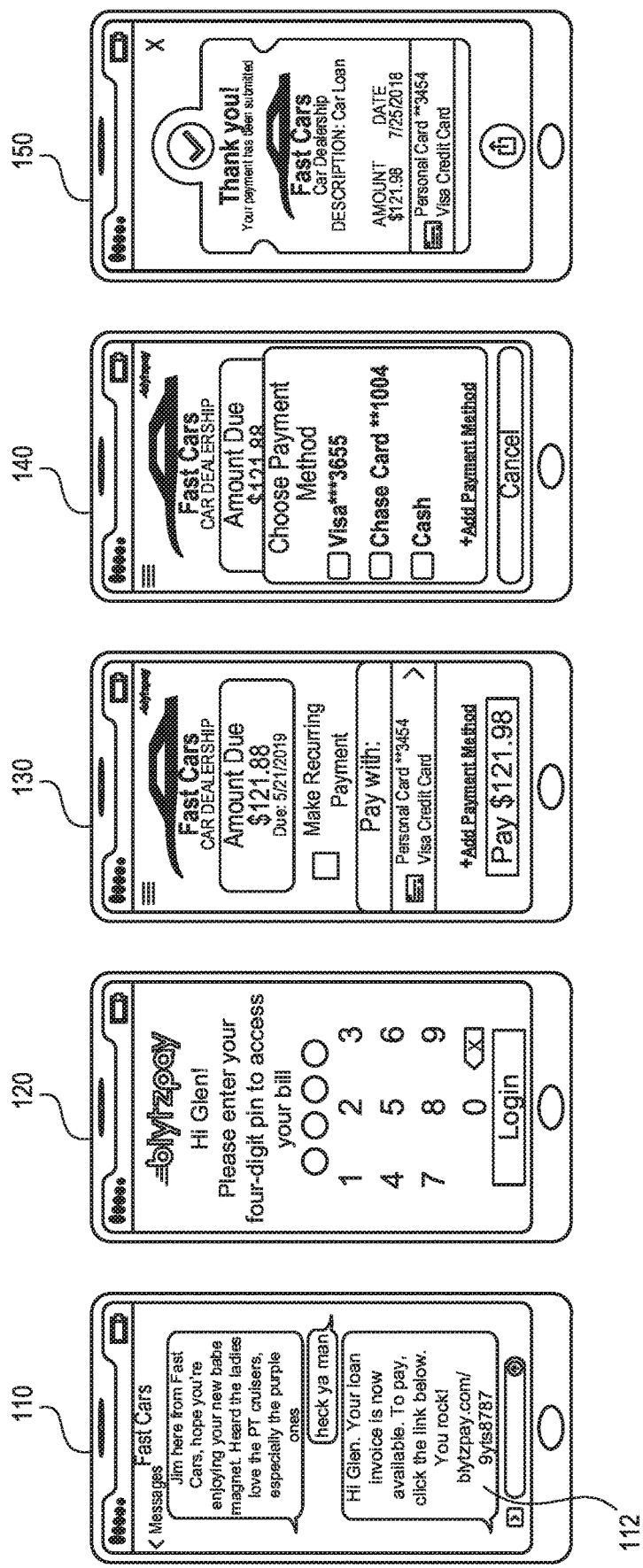
FIG. 1A illustrates example renderings of a graphical user interface (GUI) for a payment processing platform that facilitates digital engagement, invoicing, and payments between customers and vendors, according to various embodiments.

Payment processing systems facilitate financial transactions. Payment processing systems securely collect customer funds, personal information, and financial information, remit payments to vendors and/or other financial institutions, and/or determine if requested transactions should or should not proceed. Payment processing systems interact with customers, vendors, and merchants to complete transactions.

In some embodiments, a payment processing system facilitates communication between vendors and associated customers. For example, a vendor may send a customer a reminder and/or an invoice. Communication content may include a mechanism comprising a digital "button," URL, link, and/or hypertext to facilitate a customer paying an invoice. In some embodiments, a system may require customers to authenticate to view and/or access their invoices. A customer may choose one of several payment methods and complete a transaction. A customer's payment methods may be saved in the payment processing system for future use.

In some embodiments, a portion of a payment processing system is implemented on a mobile computing device or another gateway device (e.g., via a web app or downloadable software). In these embodiments, vendors of products or services may communicate with customers via mobile messaging, texting, and/or notifications. The communication content may include URLs and/or other links providing mechanisms for a customer to pay a vendor. For example, by clicking on a URL and/or following a provided link, a customer may be presented with an opportunity to authenticate. Upon authentication, a customer may be presented with their invoice and associated information. A customer may choose between various payment mechanisms, such as credit cards, debit cards, gift cards, prepaid cards, bank accounts, and/or cash, to complete a payment. Payments may be tokenized, vaulted, and/or saved to create a high level of security and convenience.

In some embodiments, vendors communicate with customers directly. For example, customers may share their contact information and consent to communicate with vendors. Vendors can then communicate directly with customers through various communication channels and/or mechanisms. In some embodiments, vendors communicate with customers through the payment processing system. Through this indirect communication, customer information may be protected and/or customer privacy maintained. In some embodiments, communication methods may include email, SMS, general messaging applications, notifications, and/or other solutions.

In some embodiments, customers may authenticate to gain access to information and/or payment processing system functionality. Customers may authenticate using any combination of one or more authentication mechanisms, including, for example, passwords, personal identification numbers (PINs), passphrases, fingerprints, facial recognition, and/or other biometric information. In some embodiments, customers may authenticate using an electronic device, such as for example, RFID tags, NFC devices, Bluetooth devices, etc.

As previously described, customers may select between one or more payment mechanisms to pay a vendor. For example, customers may choose to use a credit card, debit card, electronic funds transfer, automatic clearing house (ACH) transfer, cash, a closed-loop network account ("CLNA"), etc.

In some embodiments, a customer may deposit funds into a CLNA. A deposit may be accomplished through a payroll deduction, a deposit kiosk, and/or a partner retailer or other load network service provided. A deposit may be initiated by interacting with the payment processing system. The payment processing system may generate a deposit identification number. A partner retailer and/or deposit kiosk may accept cash, credit card, debit card, and/or other forms of funds. When funds are accepted, a partner retailer, deposit kiosk, or other load network provider or machine will read and/or otherwise consume the generated deposit identification number.

The deposit identification number ensures that the deposited funds are associated with the proper customer account. In some embodiments, the deposit identification number may comprise a bar code, QR code, alphanumeric string, NFC code, RFID code, Bluetooth code, and/or some other identifier. In some embodiments, funds in a CLNA, associated with a customer, may be expended by the customer using various forms of payment comprising credit cards, prepaid debit cards, ACH transfers, and/or other forms of payment. For example, a customer may purchase a product and/or service from a vendor using a prepaid debit card. During a customer-to-vendor transaction, the payment processing system may, for example, remit payment via a debit card or ACH transaction. Such an implementation would incur external fees.

In other embodiments, vendors may have their own CLNAs. These vendors may accept payment from customers, who also have CLNAs, through ledger adjustments within the payment processing system. These vendors may periodically transfer funds from their CLNA to other external accounts.

In some embodiments, a vendor may invoice a customer through the payment processing system. The payment processing system generates an invoice for the vendor and communicates with and/or notifies the customer of their need to remit payment. The customer may deposit funds into their CLNA and/or remit payment from their CLNA. Messaging may include payment reminders, marketing messages, confirmations, reminders, and the like. Messaging may be done through a mobile app, SMS, email, MMS, social media messaging systems, and/or the like.

In some embodiments, the ledger within the payment processing system may be centralized, distributed, and/or otherwise implemented. A ledger may, for example, utilize a verifiable blockchain technology or alternatively be implemented as a private database. The payment processing system ledger keeps an accounting of customer and vendor account transactions and/or balances. Payments or transfers between customers, between vendors, from customers to vendors, and from vendors to customers (e.g., returns) occur on the ledger without any fees being incurred for credit card transactions, debit card transactions, wire transfers, or ACH transfers.

According to various embodiments, a digital engagement and payment platform facilitates communication with customers to facilitate payment transactions between customers and vendors (both of which may be considered customers from the standpoint of the digital engagement and payment platform). The digital engagement and payment platform, as described herein, allows merchants and other vendors to maintain communication with their customers via text messages, send invoices, and send reminders. According to various embodiments, the digital engagement and payment platform may include an API to facilitate integration with the vendor's existing accounting, billing, and customer relationship management systems.

According to various embodiments, the digital engagement and payment platform is referred to herein as BlytzPay, but it is appreciated that the name of the platform may be changed or updated. In some embodiments, the platform may be gray-labeled to allow each merchant or other vendor to use their own brand or labeling on the platform and various graphical user interfaces (GUI).

According to various embodiments, the systems and methods described herein may include a ledger management subsystem that maintains a ledger of account balances of each of a plurality of ledger accounts. The system and methods described herein may manage text messages and other communication formats between customers and vendors (e.g., merchants, other customers, payees, etc.). The payment aspects of the systems and methods described herein allow customers to pay bills, invoices, and other amounts owing to payees using any of a wide variety of payment approaches. In some embodiments, the system and methods described herein allow customers to make payments to payees using a combination of different payment types. Examples of possible payment types include credit cards, charge cards, debit cards, automatic clearing house (ACH) transfers, wire transfer, and/or any of a wide variety of third-party payment systems, such as peer-to-peer payment networks.

In various embodiments, the systems and methods described herein allow for a customer to pay a payee using a combination of partial payments via different payment types, including a payment type in which the customer delivers cash to a cash-accepting load network, as described herein. In various embodiments, the system may receive a plurality of partial payments that add up to the total amount owed to the merchant or other vendor. Transactions between accounts in the closed-loop network may be implemented by updating entries in a ledger.

In some instances, a merchant may accept partial payments, and so each partial payment made by a customer may be forwarded or paid to the vendor (e.g., moved from the customer's CLNA to the vendor's CLNA). In other instances, the merchant or other vendor may not accept partial payments. For example, acceptance of a partial payment may, in some instances, limit the vendor's ability to foreclose or repossess the collateral. In either instance, if the system determines that the partial payments cumulatively sum to the total amount owed, the payment is forwarded to the payee.

A triggering event, such as a failed partial payment or the expiration of a time limit for the customer to complete the partial payments that sum to the total payment owed, may result in an evaluation of whether the payee (e.g., vendor or another merchant) accepts partial payments. In response to a determination that the payee does not accept partial payments, the system may revers any received partial payments to the customer. In response to a determination that the payee does accept partial payments, the system may forward any received partial payments to the payee and indicating a remaining balance that is still owed by the customer to the payee. In some instances, late fees, additional interest, or other penalties may also be owed if partial payments failed to sum to the total amount owed.

In various embodiments, the systems, methods, and platforms described herein may be at least partially embodied as an application, such as a mobile app, on a portable electronic device, such as a cellular phone, laptop, wearable electronic, or laptop device. The application may cause a GUI to be displayed on an electronic device of the portable electronic device through which the customer may interact. The system may display digital communications (e.g., SMS or MMS messages) on the electronic display of the customer's portable electronic device. One or more of the digital communications may request that the customer make a payment to a payee, such as a vendor, merchant, or another customer. The mobile app may authenticate the customer via authentication credentials, such as a pin or password.

In various embodiments, the GUI may display a plurality of available payment options for the customer to make the payment. The customer may select a single payment option or multiple payment options. Normally, vendors and merchants that don't want to accept partial payments cannot allow customers to make the payment using a combination of different payment methods. The presently described systems and methods provide a digital, no-transaction-cost escrow account for a customer to make multiple partial payments. The partial payments are stored in escrow until the full amount due is received, at which time it is paid to the payee. If the customer fails to make sufficient partial payments to sum to the total amount owed, the partial payments may be reversed and refunded from the escrow account back to the customer—the payment to the payee having failed.

In some embodiments, the system may facilitate partial payments via cash deposits by the customer through a cash-accepting load network. The mobile app may display (or otherwise provide) an identification code used to associate cash provided by the customer to the cash-accepting load network with the customer. As previously described, the GUI may provide access to a ledger-based CLNA to which the customer may deposit funds using any of a wide variety of deposit or payment options.

Accordingly, various embodiments of the systems and methods described herein enable a customer to deposit funds into a customer-managed CLNA using any of a wide variety of approaches, including via a cash-accepting load network. The system may aggregate deposited funds into a common account in which funds are comingled. The system may maintain a ledger of the account balances of each account holder.

Some of the infrastructure that can be used with embodiments disclosed herein is already available, such as general-purpose computers, computer programming tools and techniques, digital storage media, virtual computers, virtual networking devices, and communications networks. A computer may include a processor, such as a microprocessor, microcontroller, logic circuitry, or the like. The processor may include a special purpose processing device, such as an ASIC, PAL, PLA, PLD, Field Programmable Gate Array, or another customized or programmable device. The computer may also include a computer-readable storage device, such as non-volatile memory, static RAM, dynamic RAM, ROM, CD-ROM, disk, tape, magnetic, optical, flash memory, or another computer-readable storage medium.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc., that perform one or more tasks or implement particular abstract data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1A illustrates example renderings 110, 120, 130, 140, and 150 of a graphical user interface (GUI) for a payment processing platform that facilitates digital engagement, invoicing, and payments between customers and vendors, according to various embodiments. The GUI may be displayed on a mobile computing device, as illustrated. Vendors of products or services may communicate with customers via mobile messaging, texting and/or notifications, as illustrated in the first GUI rendering 110. The communication content may include URLs and/or other links 112 that provide mechanisms for a customer to pay a vendor. For example, by clicking on a URL and/or following a provided link, a customer is presented with an opportunity to authenticate via the authentication GUI rendering 120.

Upon authentication, a customer is presented with an invoice and associated information in an invoicing GUI rendering 130. A customer may be provided with the ability to choose various payment mechanisms via a payment GUI rendering 140. As illustrated, the payment GUI rendering 140 may include a list of available payments, such as credit cards, debit cards, bank accounts, and/or cash via a cash-accepting load network. A customer chooses one or more of the presented payment options and completes their payment and is presented with a payment confirmation GUI rendering 150.

Figure 1B:
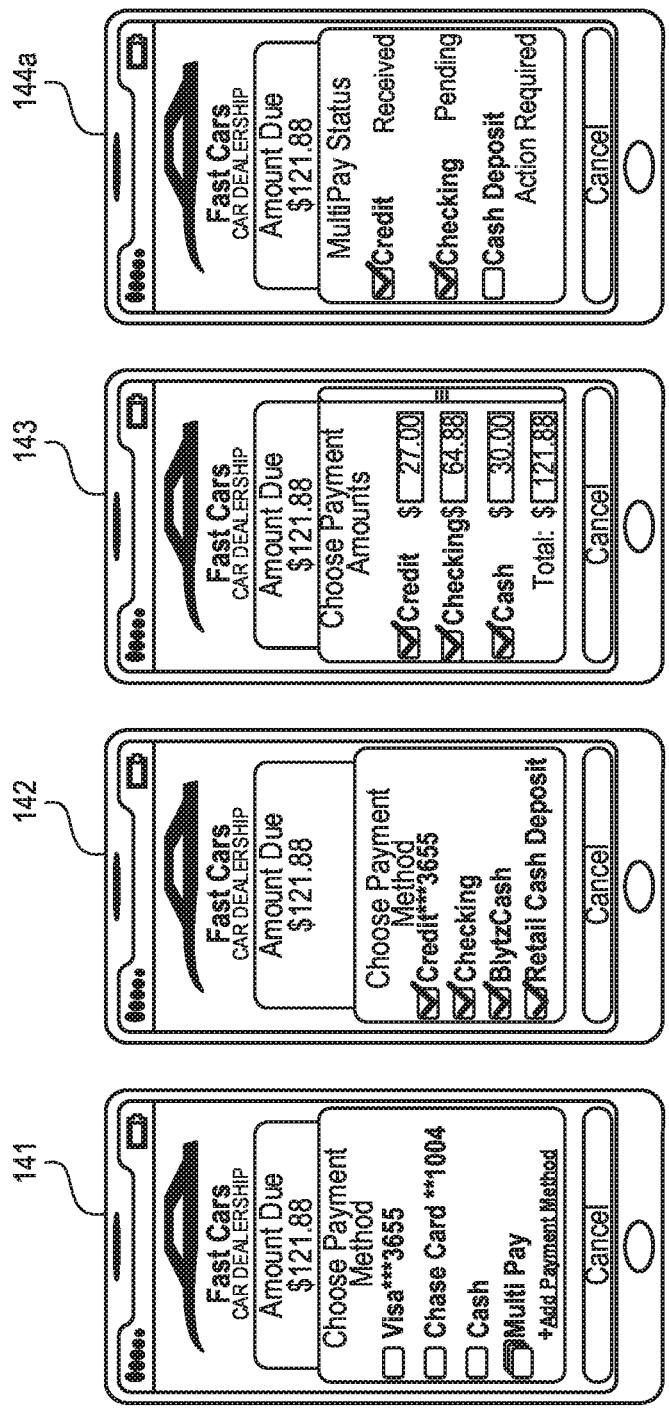
FIG. 1B illustrates example renderings of a GUI enabling multipay functionality, according to various embodiments.

FIG. 1B illustrates example rendering payment GUI rendering 141 that offers the customer the option of paying an amount due via "multipay," in which multiple payment methods may be combined. Any of a wide variety of payment options may be made available via a payment option selection GUI rendering, such as the payment option selection GUI rendering 142. As illustrated in the multipay GUI rendering 143, the customer may select the amount of each partial payment to be made using any combination of the selected payment types.

GUI rendering 144a is an example of a status report of a multipay action initiated by a customer. As illustrated, the credit card partial payment was received, the checking account transfer (e.g., ACH or wire) is pending, but no further action is required on the part of the customer. However, the cash deposit requires further action by the customer. Specifically, the customer must visit a cash-accepting load network and provide them with cash.

Figure 1C:
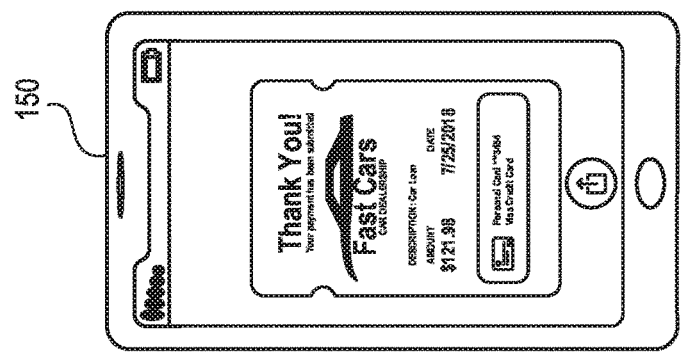
FIG. 1C illustrates example renderings of a GUI to facilitate customer cash deposits via a cash-accepting load network, according to various embodiments.
Figure 1C:
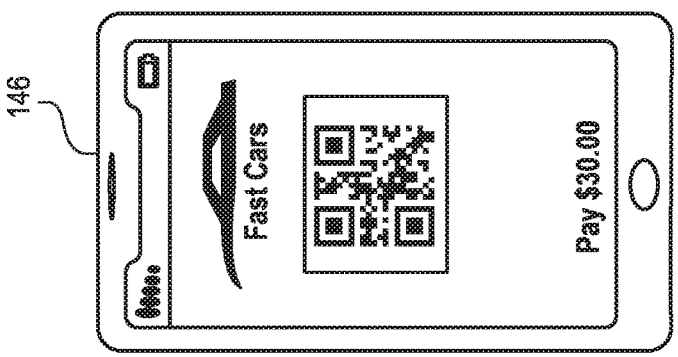
Figure 1C:
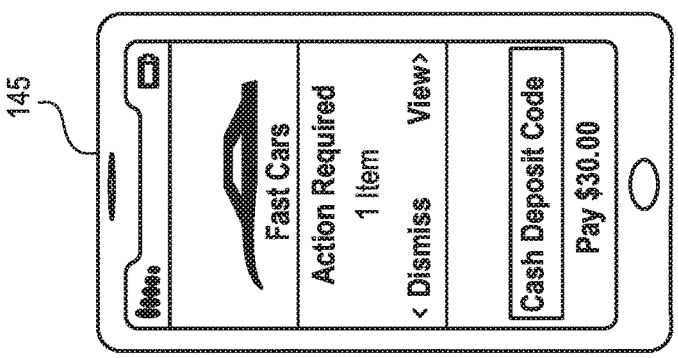
Figure 1C:
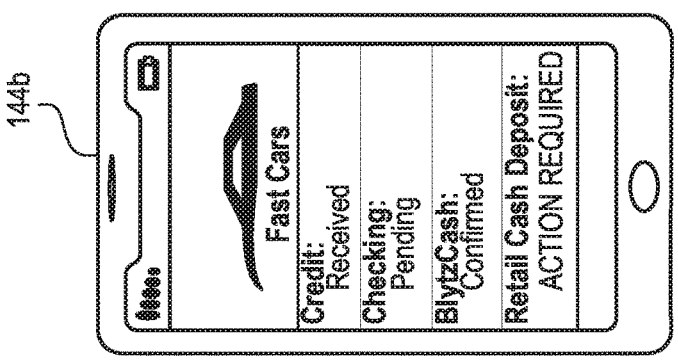

FIG. 1C illustrates example renderings of a GUI to facilitate customer cash deposits via a cash-accepting load network, according to various embodiments. GUI rendering 144b is an alternative GUI rendering similar to the GUI rendering 144a. In GUI rendering 144b, the partial payment via the credit card is noted as received, and the partial payment via a checking account is noted as pending. A partial payment made via the customer's CLNA balance is immediately confirmed since it can occur via an immediate ledger transfer under the control of the system itself. Again, the retail cash deposit is noted as "action required," since the customer must visit a cash-accepting load network and provide them with cash.

GUI rendering 145 illustrates an interface for the customer to initiate a cash deposit with a cash-accepting load network (e.g., a retail location, ATM, or kiosk). GUI rendering 146 illustrates a QR code that can be used by a cash-accepting load network to associate cash delivered by the customer with the correct CLNA. In various embodiments, as described herein, the cash-accepting load network may keep a portion (e.g., a percentage or fixed amount) of the cash deposit. Thus, to make a $30 cash deposit, the customer may be required to deliver $35, assuming a $5 fee applies. GUI rendering 150 illustrates a payment confirmation.

Figure 2:
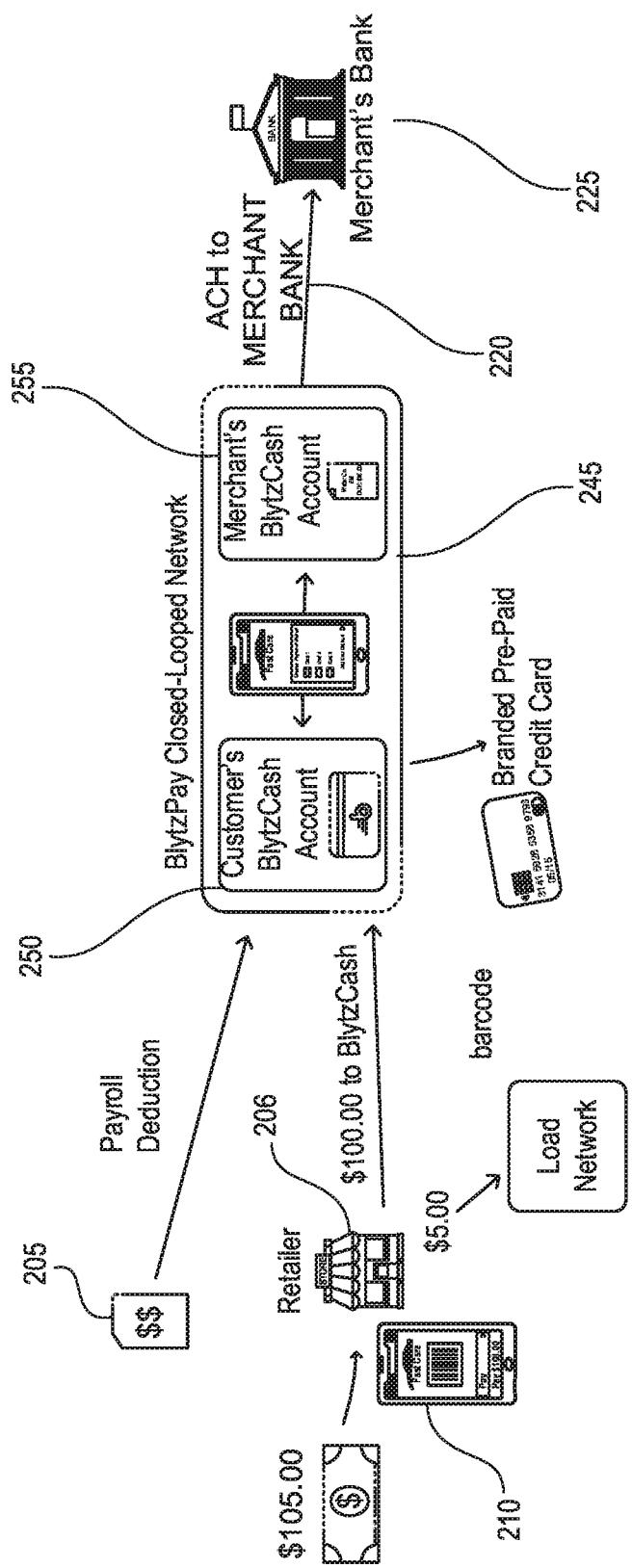
FIG. 2 illustrates an example flow diagram of several ways for a customer to add money to a closed-loop network account ("CLNA"), including by delivering cash to a load network.

FIG. 2 illustrates a flow diagram of an embodiment enabling customers to deposit funds into their CLNAs that are part of a common closed-loop network 245 with multiple account holders. A deposit may be accomplished through a payroll deduction 205, a deposit kiosk (not illustrated), a partner retailer 206, and/or a financial institution partner (not illustrated). A deposit may be initiated by interacting with the payment processing system. The payment processing system may generate a deposit identification number 210, such as a QR code displayed on a smartphone or another portable electronic device. A partner retailer 206 and/or deposit kiosk may accept cash, credit card, debit card, and/or other forms of funds. When funds are accepted, a partner retailer 206 and/or deposit kiosk will read and/or otherwise consume the generated deposit identification number 210. The deposit identification number 210 ensures that the deposited funds are associated with the proper customer account. In some embodiments, the deposit identification number 210 may comprise a bar code, QR code, alphanumeric string, NFC code, RFID code, Bluetooth code, and/or some other identifier.

In some embodiments, a web interface and/or mobile application may use customer location information to identify nearby retail locations and/or kiosks that will accept cash for deposit into the CLNA. While customers, merchants, vendors, and the like may be described as each having a CLNA, the actual implementation may be a single aggregated CLNA that utilizes a ledger to maintain records of the balance of each participant (customer, merchant, vendor, etc.). As described herein, transfers from one CLNA participant to an another CLNA participant can be implemented by a ledger transfer, without incurring external transfer or processing fees.

In some embodiments, funds in a CLNA, associated with a customer, may be expended by the customer using various forms of payment, such as via a credit card, a prepaid debit card, an ACH transfer, a wire transfer, and/or the like. For example, a customer may purchase a product and/or service from a vendor using a prepaid debit card. During the customer-to-vendor transaction, the payment processing system remits payment to the merchant via a debit card transaction (e.g., using Visa). Transfers from a customer's CLNA 250 to the CLNA 255 of a merchant or other vendor may be implemented by a ledger transfer without incurring fees through external payment processors or funds transfer fees. Any number of customers may utilize their CLNA 250 to pay a single merchant CLNA 255 during a time period (e.g., an hour, a day, a week, a month, etc.). Each of these payments may be implemented by an internal CLNA ledger update. Ultimately, the merchant may initiate an ACH transfer, at 220, to move the money from the merchant CLNA 255 to the merchant's bank 225.

Figure 3:
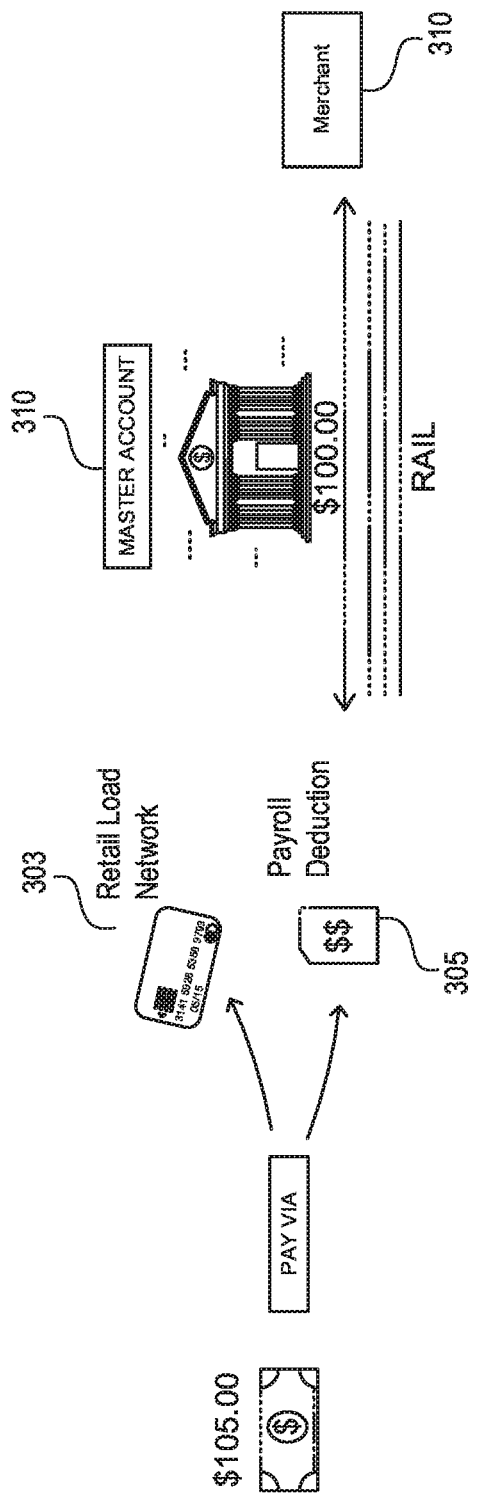
FIG. 3 illustrates an example flow diagram of two of the many ways a customer can credit a CLNA facilitating the payment of invoices to vendors connected to the payment processing system.

FIG. 3 illustrates a flow diagram of an embodiment enabling customers to deposit cash into a CLNA via a retail load network 303 and/or a payroll deduction 305. As described herein, many alternative methods may be used to deposit money, including cash, into the CLNA. A master CLNA maintains a ledger of the amounts of each customer. The master CLNA may be implemented as a For Benefit Of ("FBO") or "Trust" account 310, for which a ledger is maintained to track the balances of each participant (e.g., customers, vendors, merchants, etc.). Vendors may have accounts in the CLNA, the balance of which are recorded in the ledger as well. These vendors may accept payment from customers through ledger adjustments within the payment processing system. These vendors may periodically transfer funds from the CLNA to other external accounts.

Figure 4:
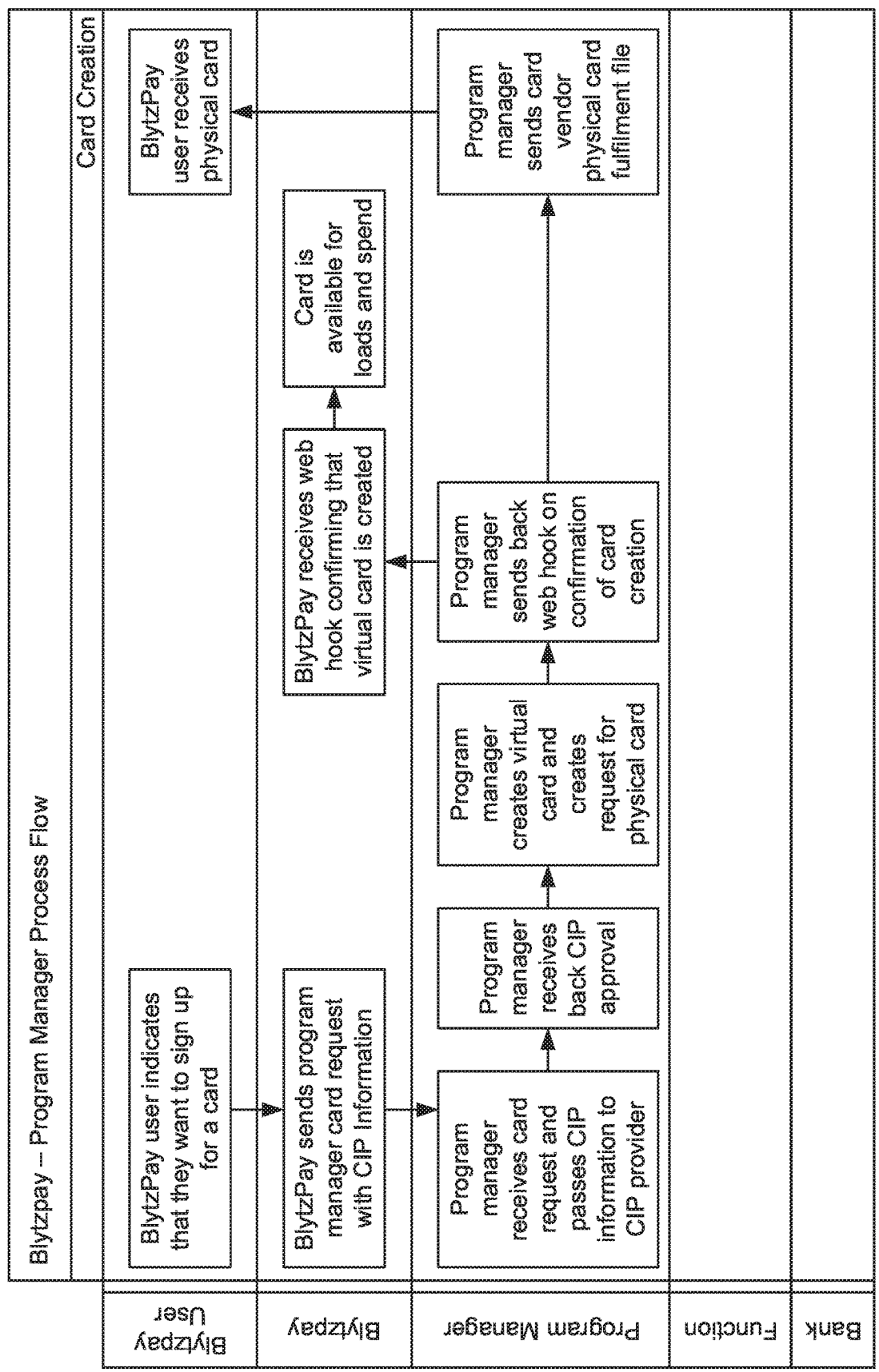
FIG. 4 illustrates a flow diagram for a process flow for creating reloadable virtual and/or physical payment card(s), according to one embodiment.

FIG. 4 illustrates a flow diagram for a program manager process flow for creating a reloadable card, according to one embodiment. In the illustrated example, the CLNA provider is BlytzPay, but any name could be used. A customer (e.g., a BlytzPay user) may request a card (e.g., a debit, credit, store-specific, or CLNA-specific card). As illustrated, virtual and/or physical card(s) may be provided to the customer.

Figure 5:
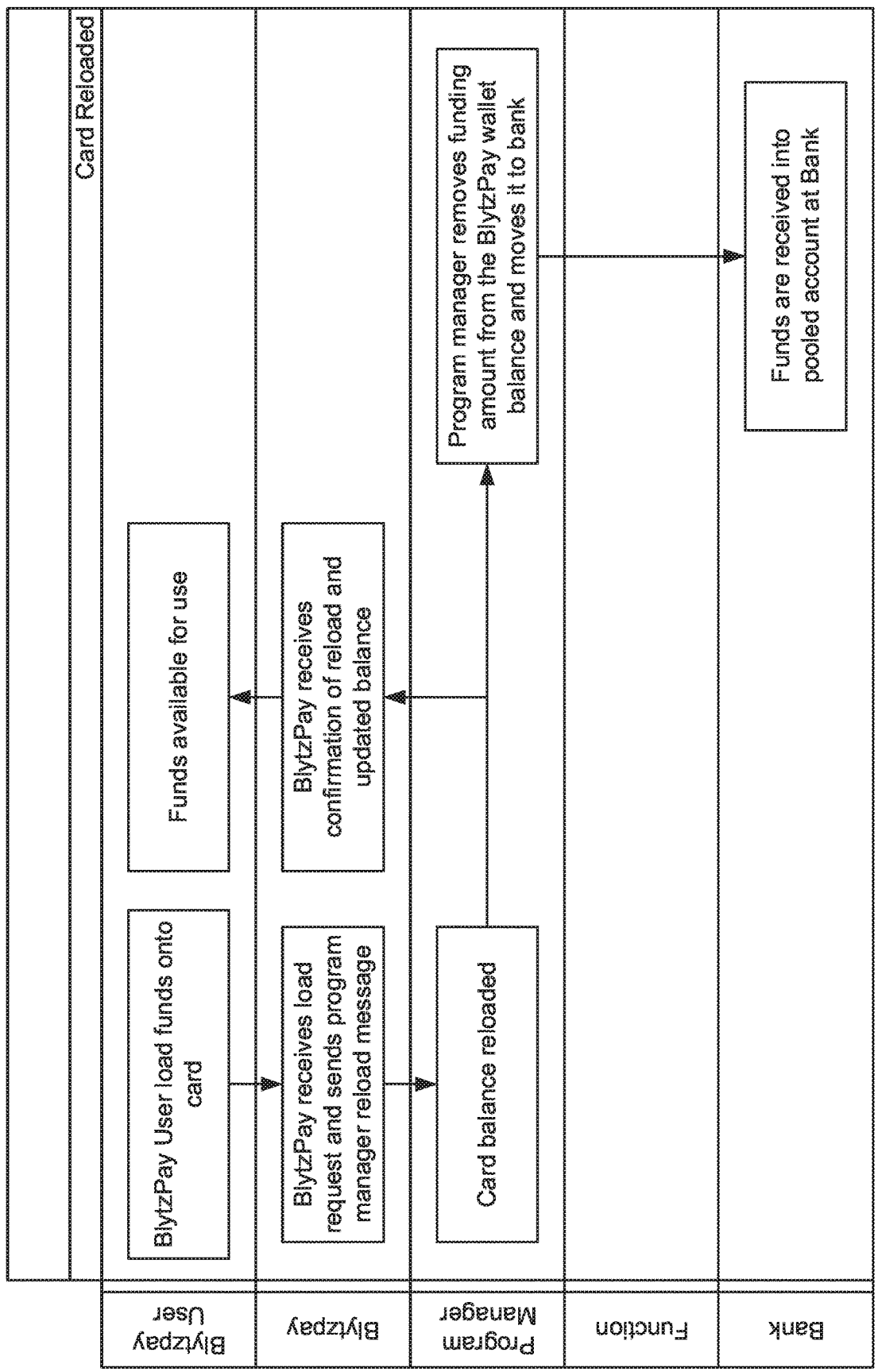
FIG. 5 illustrates a flow diagram for reloading a reloadable card, according to one embodiment, in which a bank is used to pool funds of multiple users.

FIG. 5 illustrates a flow diagram for reloading a reloadable card, according to one embodiment, in which a bank partner or other entity provides a financial aggregation account is used to pool funds of multiple users. Deposited funds are pooled at the bank, and balances are updated in the ledger.

Figure 6:
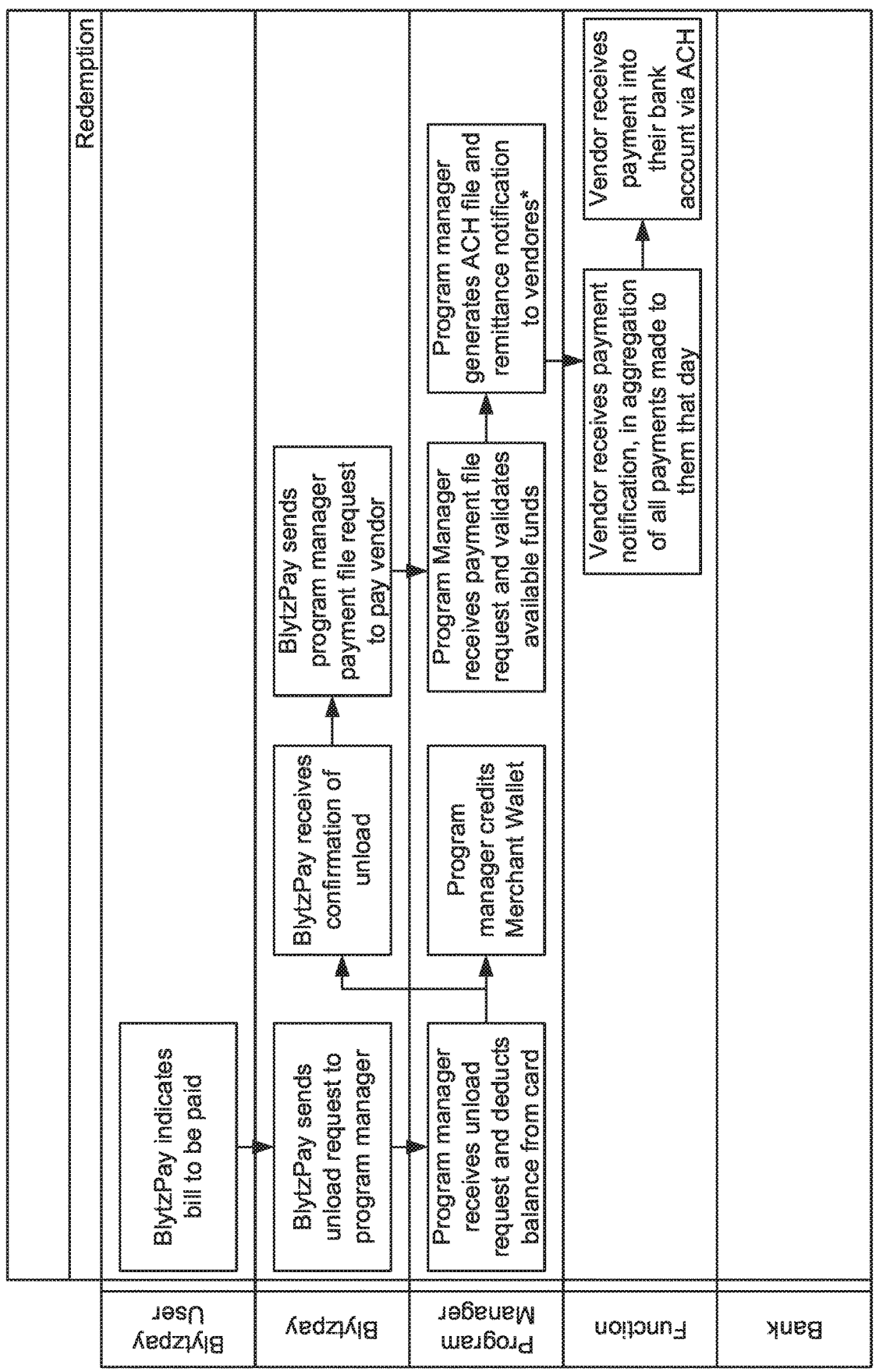
FIG. 6 illustrates a flow diagram for customers to pay vendors, according to one embodiment, in which vendors receive a single, daily automatic clearing house (ACH) transfer of the aggregate payments made by customers.

FIG. 6 illustrates a flow diagram for customers to pay vendors, according to one embodiment, in which vendors receive a single, daily ACH transfer of the aggregate payments made by customers. Many customers may make payments during a given day (or week/month/year, or with a manual ACH transfer initiated by the vendor on demand). In existing systems, each transaction might incur a credit/debit card transaction fee, a wire transfer fee, and/or an ACH transfer fee. By aggregating the payments in the ledger and then performing a single ACH (or other) transfer, the total fees are significantly reduced.

Three different systems are described below to provide a clear contrast between some existing approaches and the systems and methods described herein.

DIRECT-TO-VENDOR LOAD NETWORK: A load network may partner with retail locations to receive cash deposits from customers intending to pay specific vendors. Vendors individually sign up with the load network to enable their customers to make payments at the retail locations. The customer does not have an account with the load network. Instead, from the customer's perspective, the cash deposited at the retail location went directly to the intended vendor recipient.

PREPAID CARD LOAD NETWORK: A load network may partner with retail locations to receive cash deposits from customers for reloading a prepaid debit or credit card. The customer has a credit card account and can use the physical credit card at various vendor locations and/or online to make online payments to vendors. Every subsequent transaction by the customer to pay a vendor or another merchant incurs external credit/debit card fees (e.g., Visa/Master Card/American Express, etc.).

CASHLESS LEDGER-BASED SYSTEMS: Online ledger-based accounts may be used to facilitate peer-to-peer transactions and/or customer-to-vendor transactions. Examples of this are PayPal, Venmo, and the like. However, customers may only deposit money into the ledger-based account using an existing bank account, credit card, or debit card. Cash cannot be deposited into these ledger-based accounts, and in most instances, the customer is required to have a bank account or credit card. These systems do not serve cash-preferred or cash-only customers that cannot or choose not to have bank accounts.

None of the three systems described above are easily useable by cash-preferred or cash-only customers. Accordingly, in contrast to the three distinct approaches described above, the presently described systems and methods provide increased utility and benefits to cash-preferred and cash-only customers by providing the fee-reducing benefits of the ledger-based systems, eliminating or reducing credit/debit card transaction fees associated with the prepaid card load network approach, and allow customers to manage their balance within the CLNA ledger in ways not possible with direct-to-vendor load network approaches.

Some vendors will not accept debit or credit cards online, are not signed up for direct-to-vendor load networks, and do not have cashless ledger-based system accounts. Such vendors may require customers to either make electronic ACH transfers or mail paper checks. In some embodiments of the presently described systems and methods, a customer may use a load network to deposit cash into the CLNA. Similar to the three systems described above, the customer may use the CLNA to load a prepaid credit card for use with card-accepting vendors and/or make ledger-based transfers to vendors signed up with the CLNA. However, unique to the systems and methods described herein, in some embodiments, customers may also make ACH transfers from the CLNA account to vendors not signed up with the CLNA. The customer may initiate an ACH transfer (or mail a physical check) from the master CLNA account, or through a third-party ACH provider, to the vendor—regardless of whether the vendor is signed up for the CLNA or not.

Figure 7:
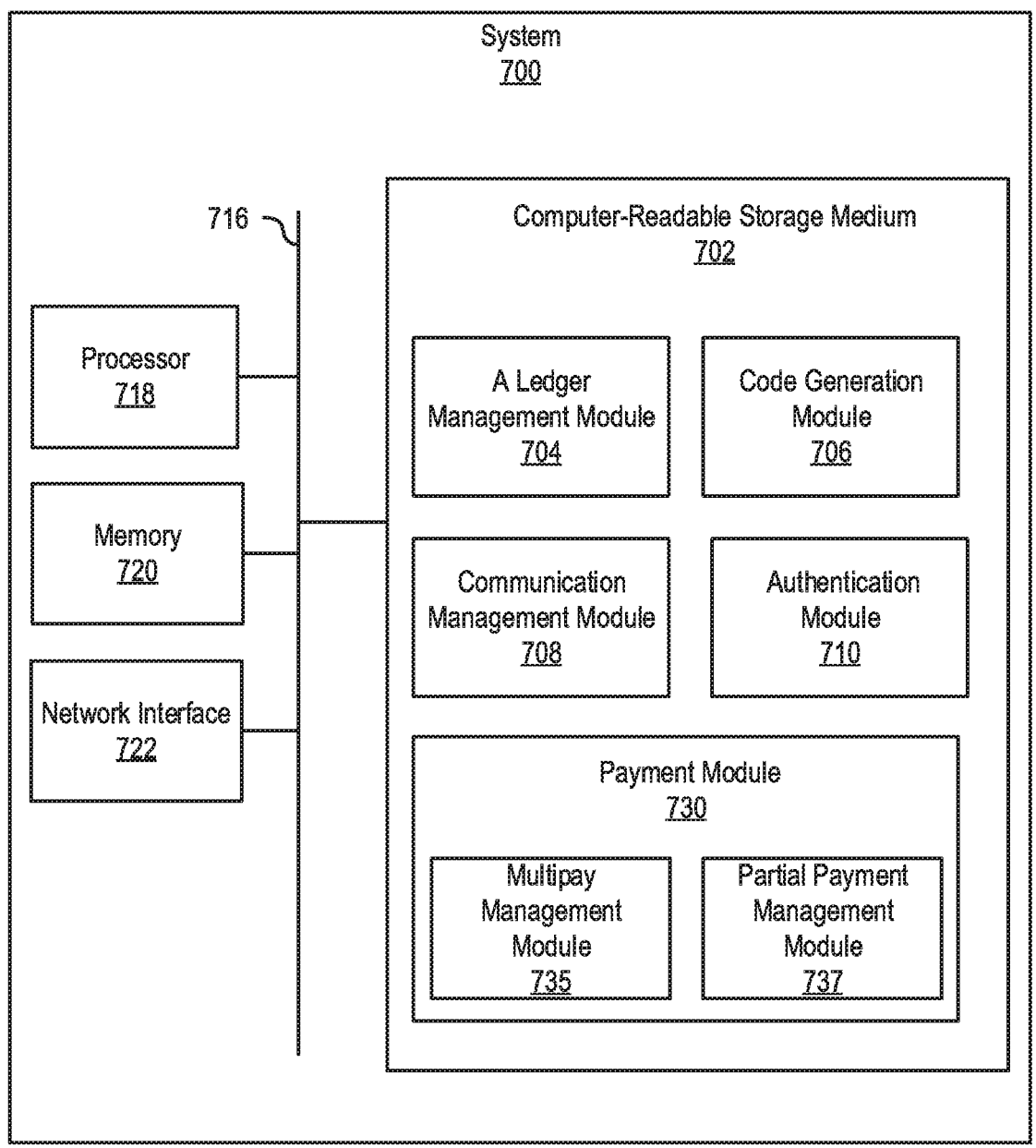
FIG. 7 illustrates a computing system to digitally engage a customer and facilitate payment processing.

FIG. 7 illustrates a computing system 700 to digitally engage a customer and facilitate payment processing. As illustrated, the system 700 may include a bus 716 that connects a processor 718, memory 720, a network interface 722, and a computer-readable storage medium 702. The computer-readable storage medium 702, such as a non-transitory computer-readable storage medium, may include various hardware, software, and/or hardware/software combination modules or subsystems, illustrated as modules 704, 706, 708, 710, 730, 735, and 737.

According to various embodiments, a ledger management module 704 maintains a ledger of account balances of each of a plurality of ledger accounts. A communication management module 708 facilitates digital engagement and interactions with the communication and payment subsystems of the platform. The communication management module 708 may manage digital communications between a customer and a payee or payees (e.g., merchants, vendors, other users, etc.).

As an example, the communication management module 708 may transmit a request for the customer to make a payment to a payee. Examples of possible communication channels include, but are not limited to, email, SMS, general messaging applications, notifications, and/or other solutions. The communication content may include URLs and/or other links providing mechanisms for a customer to pay a vendor or another payee. For example, by clicking on a URL and/or following a provided link, a customer is presented with an opportunity to authenticate via the authentication module 710 and make payments via the payment module 730.

A code generation module 706 may generate one-time use or static code that can be provided to a customer for display on a portable electronic device of the customer. The code or "identification code" is used by the cash-accepting load network to identify cash received by the customer as a partial payment intended for the payee. According to various embodiments, the code may be in the format of a QR code, a barcode, an alphanumeric code, a code transmitted via NFC chip, a code transmitted via RFID tag, a code transmitted via a wireless signal, a verbal code passed from the customer to the teller, etc. The system may authenticate customers via an authentication module 710 via pin numbers, facial recognition, biometric scans, passwords, usernames, codes, and/or other credentials.

The payment module 730 may include, as illustrated, a multipay management module 735 and a partial payment management module 737. The payment module 730 may effectuate the transfer and payment of money between customers of the system. Customers of the system may include individual customers, vendors, merchants, payees, and payors. In embodiments of the system operated by a single vendor or merchant (e.g., in a gray-labeled product), the vendor may be the only payee, and the various customers may be customers or clients of the vendor.

In one embodiment, the payment module 730 presents multiple payment options to a customer that can be used by the customer to pay a bill or invoice. Any of the various examples of payment options described herein may be made available via the payment module, which, in many instances, may interact with third-party systems and APIs to initiate and confirm payments. For example, ACH and credit card payments may be processed in conjunction with other banks, card issues, clearinghouses, and the like.

The multipay management module 735 may facilitate a payment to a payee that is made in partial amounts using a combination of different payment methods. The partial payment management module 737 may determine that a total amount owed has been cumulatively received via a plurality of partial payments and then execute a ledger transaction or transactions via the ledger management module 704 to transfer the total amount (previously held in an escrow, trust, or holding account) to the payee (e.g., to a ledger account of the payee or via an ACH or wire transfer to an external account of the payee.

The partial payment management module 737 may also detect failed partial payments or expired time periods during which a full payment was not made. In such instances, the partial payment management module 737 may refund and reverse the partial payments (sometimes with a fee) if the payee does not accept partial payments. In other instances, the received partial payments may be paid to the payee, and the amount owed by the customer may be updated to reflect the partial payment.

Figure 8:
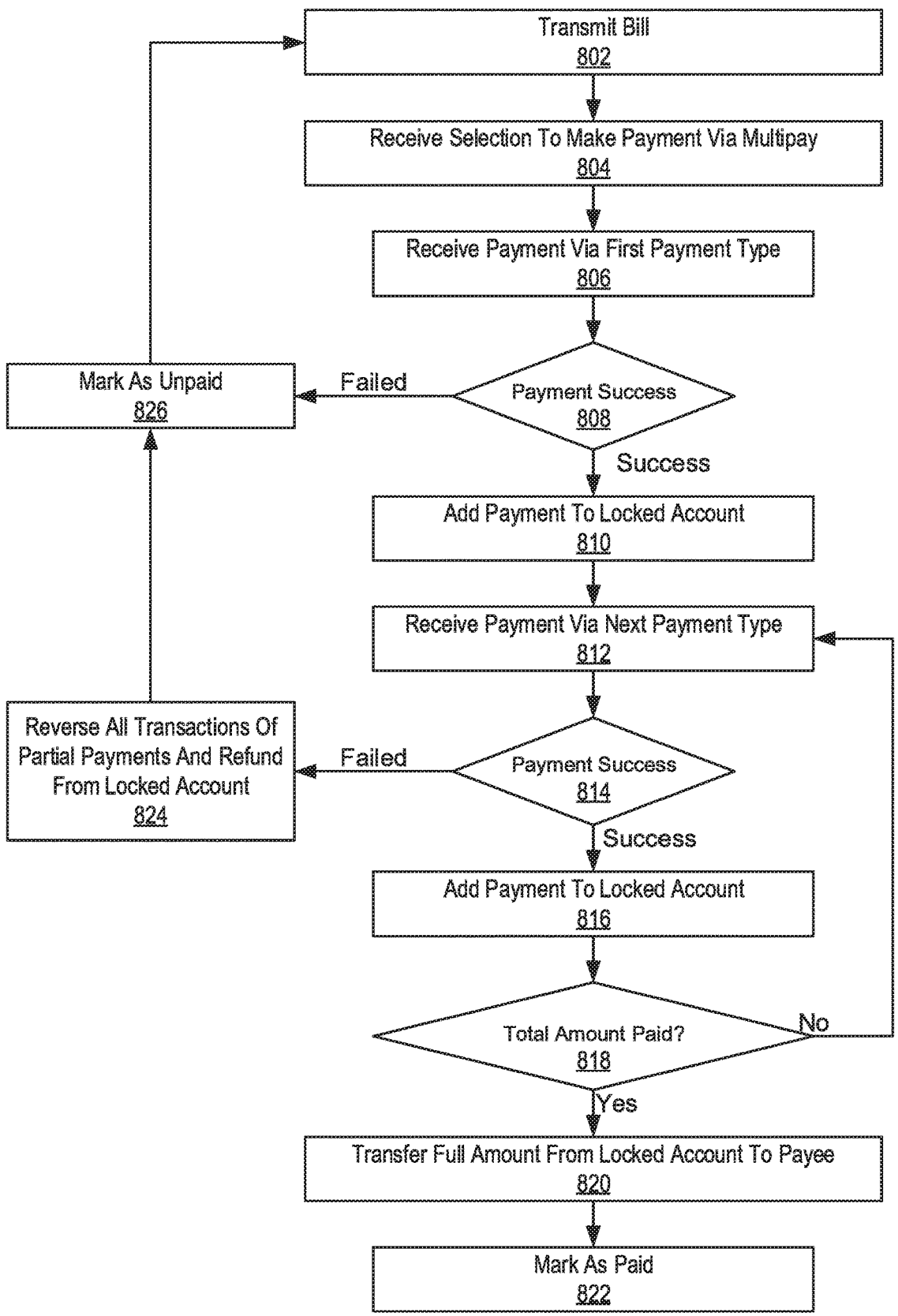
FIG. 8 illustrates a method to facilitate multipay partial payments in which the transactions are reversed if the total amount due is not paid in full, according to one embodiment.

FIG. 8 illustrates a method to facilitate multipay partial payments in which the transactions are reversed if the total amount due is not paid in full, according to one embodiment. As illustrated, the system may transmit, at 802, a bill to a customer that is to be paid by the customer to a payee. The payee may not accept partial payments. For example, the payee may hold a vehicle as collateral against a loan given to the customer. If partial payments are received by the payee, then the payee's legal rights for recourse, such as repossession, may be hampered or delayed. The system may receive, at 804, a selection by the customer to pay the bill using multipay. The system may notify the customer that the payee does not accept partial payments and that no payment will be made to the payee until the sum total of partial payments equals the total amount owed to the payee. The system may receive, at 806, a first payment via a first payment type. Payments, such as credit card payments, may be immediately confirmed, while payments such as ACH transfers may take 1-2 days to confirm. Payments from a CLNA managed by the system may be instantly confirmed.

If the first payment is not successful, at 808, the invoice or bill may be marked as unpaid, at 826. If the first payment is successful, at 808, then the payment may be added, at 810, to a locked account (e.g., a trust, holding, or escrow-type account recorded via a ledger entry in a CLNA). The system may receive, at 812, another partial payment via a next payment type that is different than the first payment type. In this case, if the payment fails, at 814, then all transactions of partial payments may be reversed, at 824, and refunded from the locked account since the payee does not accept partial payments.

If the next payment is successful, at 814, the system may add, at 816, the partial payment amount to the locked account. If the system determines, at 818, that the sum of the partial payments equals the total amount owed, then the full amount owed is transferred, at 820, from the locked account to the payee, and the invoice or bill is marked, at 822, as paid. Otherwise, if the system determines, at 818, that the total amount has not yet been paid in full into the locked account, the system awaits payment via the next payment type, at 812. Any number of partial payments may be made using any number of different payment types until the system confirms, at 818, that the total amount has been paid into the locked account before transferring, at 820, the full amount to the payee.

A system implementing the approach described in FIG. 8 allows for merchants and loan holders to only accept full payments for periodic invoices and deny partial payments while still allowing for customers to pay the total amount using a combination of payment types, and without having to engage the services of a third party. The merchant or loan holder may utilize the system internally without involving any third-party escrow service that would presumably charge fees and/or introduce delays and/or undermine the private relationship between the loan holder or merchant the customer. Finally, the systems and methods described herein allow for cash customers to deposit cash via cash-accepting load networks as part of a multipay system—something that is not available in traditional payment systems and especially useful for non-banking customers that don't have access to traditional bank resources and credit sources.

The methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified and/or steps or actions may be omitted.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer-executable code located within a memory device and/or transmitted as transitory or non-transitory electronic signals over a system bus or wired or wireless network. Many of the embodiments described herein are shown in block diagram form and/or using logic symbols. It is appreciated that various elements of each of the illustrated and described embodiments could be implemented using FPGAs, custom application-specific integrated circuits (ASICs), and/or as hardware/software combinations.

In the description above, various features are sometimes grouped in a single embodiment, figure, or description thereof to streamline this disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A system, comprising:
   a computer processor;
   a memory in communication with the computer processor;
   a communication network in communication with the computer processor;
   a data storage communicatively connected to the computer processor;
   a ledger management subsystem to maintain a ledger of account balances of each of a plurality of ledger accounts within the data storage;
   a communication subsystem to manage digital communications between a customer and a payee via the communication network, wherein the communication subsystem is configured to transmit a request for the customer to make a payment for a total amount to the payee;
   a payment subsystem to present multiple payment options to the customer, via a rendered graphical user interface on an electronic display of a portable electronic device, the graphical user interface facilitating payment by the customer to pay the total amount to the payee, wherein the payment options include at least:
      i. a card payment option to pay via a credit card, charge card, or debit card, and
      ii. a digital cash payment option to pay via a digital cash account that is loaded by delivering cash to a cash-accepting load network; and
   a code generation subsystem to generate and provide an identification code to be displayed on the portable electronic device to facilitate loading cash into the digital cash account by delivering the cash to the cash-accepting load network, wherein the identification code is used to identify cash provided by the customer for loading into the digital cash account of the customer; and
   a multipay subsystem to:

receive a request from the customer to pay a first partial payment amount via the card payment option that is less than the total amount, authorize the first partial payment amount with a card issuer of the card payment option, receive a request from the customer to pay a second partial payment amount via the digital cash payment option, wherein the sum of the first partial payment amount and the second partial payment amount is equal to the total amount owed to the payee;

in response to a determination that the digital cash account has sufficient funds for the second partial payment:

capture the first partial payment amount via the card payment option to complete the card payment for deposit into an account of the payee, and transfer the second partial payment amount from the digital cash account to the account of the payee; and in response to a determination that the digital cash account does not have sufficient funds for the second partial payment:

do not capture the first partial payment amount via the card payment option, such that the payee does not receive any partial payment of the total amount owed, and generate a message to the customer that no payment will be made to the payee until cash is loaded into the digital cash account using the code generation subsystem.

2. The system of claim 1, wherein an identification code comprises one of a QR code, a barcode, an alphanumeric code, a code transmitted via NFC chip, a code transmitted via RFID tag, and a code transmitted via a wireless signal.

3. The system of claim 1, wherein the communication subsystem is configured to manage digital communications that comprise at least one of: an SMS text message, an MMS text message, and a message sent via a third-party messaging platform.

4. The system of claim 1, further comprising an authentication subsystem to authenticate the customer.

5. The system of claim 1, wherein the multiple payment options presented by the payment subsystem include any combination of:

an option to pay via a credit card,
    an option to pay via a charge card,
    an option to pay via a debit card,
    an option to pay by delivering cash to a cash-accepting load network,
    an option to pay via an automatic clearing house (ACH) transfer,
    an option to pay by wire transfer, and
    an option to pay via a peer-to-peer payment network.

\* \* \* \* \*